United States Patent
Hornby et al.

(10) Patent No.: US 7,449,055 B2
(45) Date of Patent: Nov. 11, 2008

(54) INKJET INK SET

(75) Inventors: John C. Hornby, Newark, DE (US); Kuo Hsiung Kung, Wilmington, DE (US); John Stephen Locke, Hockessin, DE (US); James Walter Wheeler, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/888,818

(22) Filed: Aug. 2, 2007

(65) Prior Publication Data

US 2008/0032098 A1 Feb. 7, 2008

Related U.S. Application Data

(60) Provisional application No. 60/835,830, filed on Aug. 4, 2006.

(51) Int. Cl.
*C09D 11/02* (2006.01)
*B41J 2/01* (2006.01)
*B32B 3/10* (2006.01)

(52) U.S. Cl. .................. 106/31.27; 347/100; 428/195.1

(58) Field of Classification Search .............. 106/31.27; 347/100; 428/195.1
See application file for complete search history.

(56) References Cited

U.S. PATENT DOCUMENTS

| | | | |
|---|---|---|---|
| 5,847,740 A | 12/1998 | Yamamoto et al. | |
| 5,865,883 A * | 2/1999 | Teraoka et al. | 106/31.32 |
| 6,656,228 B1 | 12/2003 | Sherwin et al. | |
| 7,077,894 B2 * | 7/2006 | Taguchi et al. | 106/31.43 |
| 7,211,129 B2 * | 5/2007 | Wheeler et al. | 106/31.27 |
| 2002/0081421 A1 | 6/2002 | Bagwell et al. | |
| 2004/0100643 A1 | 5/2004 | Jones et al. | |
| 2005/0193499 A1 | 9/2005 | Chevil | |
| 2007/0002110 A1 | 1/2007 | Wheeler et al. | |
| 2007/0076073 A1 * | 4/2007 | Hornby | 347/100 |
| 2007/0101900 A1 | 5/2007 | Wheeler et al. | |

* cited by examiner

*Primary Examiner*—Helene Klemanski

(57) ABSTRACT

The present invention pertains to a dye-based inkjet ink set with a lightfast cyan ink and, more particularly, to a dye-based inkjet ink set suitable for printing on fabrics, especially polyamide fabric. The present invention also pertains to a method for printing a polyamide fabric with the dye-based inkjet ink set, and a polyamide fabric so printed.

17 Claims, No Drawings

INKJET INK SET

CROSS-REFERENCE TO RELATED APPLICATION

This application claims priority under 35 U.S.C. §119 from U.S. Provisional Application Ser. No. 60/835,830 (filed Aug. 4, 2006), the disclosure of which is incorporated by reference herein for all purposes as if fully set forth.

BACKGROUND OF THE INVENTION

The present invention pertains to a dye-based inkjet ink set and, more particularly, to a dye-based inkjet ink set suitable for printing on a textile especially a polyamide fabric.

Digital printing methods such as inkjet printing are becoming increasingly important for the printing of textiles and offer a number of potential benefits over conventional printing methods such as screen printing. Digital printing eliminates the set up expense associated with screen preparation and can potentially enable cost effective short run production. Inkjet printing furthermore allows visual effects, like infinite pattern repeat sizes, that cannot be practically achieved with a screen printing process.

One area of textile printing ideally suited to digital printing is the flag and banner market where short runs are common. However, printing of flags and banners presents unique challenges. For example, ink is printed on one side, but must penetrate the fabric so that the image is equally visible on the back (unprinted) side as on the front (printed) side. In addition, while the ink must travel through the fabric, it must not travel laterally causing blurring and bleeding. This seemingly contradictory set of conditions is not easily achieved. Furthermore, the printed products will typically be displayed in sunny areas and the colorants in the inks are preferably resistant to light fade.

U.S. Pat. No. 5,847,740 discloses an inkjet printing process on nylon cloth. Co-pending and commonly owned U.S. application Ser. No. 11/070,711 (filed Mar. 2, 2005) discloses flag and banner printing methods and pretreatment solutions therefor. Co-pending and commonly owned U.S. application Ser. No. 11/173,595(filed Jul. 1, 2005) discloses a dye based ink set for textiles which contain acid dyes and co-pending and commonly owned U.S. application Ser. No. 11/070,711 (filed Mar. 2, 2005) discloses a dye based ink set for textiles that includes an Acid Green ink.

It is an object of this invention to provide an inkjet ink set having good gamut, light-fastness and penetration properties that is advantageous for printing on textiles especially polyamide fabric. The inkjet ink set of this invention provides an ink set in which each of the ink components provides good lightfastness. Previously described ink sets have had to rationalize a cyan ink with poor lightfastness as part of an ink set with other lightfast inks, or replace the cyan with another ink and modify the printing parameters to accommodate for the lack of the cyan.

SUMMARY OF THE INVENTION

In one aspect, the present invention pertains to a dye-based inkjet ink set comprising at least two differently colored inks, wherein at least one of the inks is a first ink which is a cyan ink comprising a cyan dye in an aqueous vehicle, wherein said cyan dye is selected from the group consisting of Acid Blue 106, Acid Blue 175, Acid Blue 239, Acid Blue 258, Acid Blue 280, Acid Blue 290, Acid Blue 292, Acid Blue 294, Acid Blue 341 and Acid Blue 343, and mixtures thereof. In a preferred embodiment, the first ink comprises the cyan dye in an amount of from about 3 wt % and about 10 wt %, based on the total weight of ink. In a more preferred embodiment the first ink comprises the cyan dye in an amount of from about 4 wt % to about 8 wt %, alternatively from about 4 wt % to about 7 wt %, based on the total weight of the ink.

In one preferred embodiment, the ink set with the aforementioned cyan dye further comprises one or more of inks (a) through (h) defined as follows:
 (a) a yellow ink comprising Acid Yellow 79 dye in an aqueous vehicle;
 (b) a navy ink comprising Acid Blue 113 dye in an aqueous vehicle;
 (c) a blue ink comprising Acid Blue 260 in an aqueous vehicle;
 (d) a green ink comprising Acid Green 28 in an aqueous vehicle;
 (e) a black ink comprising Acid Black 194 in an aqueous vehicle;
 (f) a magenta ink comprising Acid Red 361 or Reactive Red 245 in an aqueous vehicle;
 (g) an orange ink comprising Reactive Orange 13 or Reactive Orange 95 in an aqueous vehicle; and/or
 (h) a violet ink comprising Acid Violet 48 in an aqueous vehicle.

In another aspect, the present invention pertains to an ink set comprising a first, second ink and third ink, and optionally up to five more additional (fourth, fifth, sixth, seventh and eighth) inks. The first ink is the cyan ink described above, and the second, third and any optional additional ink(s) are selected, in any combination, without duplication, from inks (a) through (h) as described above.

In yet another aspect, the present invention pertains to a method for ink jet printing, comprising in any workable order the steps of:
 (a) providing an ink jet printer that is responsive to digital data signals;
 (b) loading the printer with a fabric to be printed;
 (c) loading the printer with an inkjet ink set as set forth above; and
 (d) printing onto the substrate using the inkjet ink set in response to the digital data signals.

Optionally (and preferably), the process further comprises the following steps:
 (e) heating the printed fabric with steam-treatment to set the printed inks, and
 (f) washing the steam-treated fabric.

The preferred fabrics for this inkjet ink set are silk, wool, polyamide fabrics and the like. In still another aspect, the present invention pertains to polyamide fabric article printed according the above inkjet printing method.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

Colorants

The inks of the present ink set are characterized by the presence of certain, specified colorants. The colorants (dyes) are substantially soluble in the ink vehicle (aqueous).

Reference to the specified dyes is made by their "C.I." designation established by Society Dyers and Colourists, Bradford, Yorkshire, UK and published in the *The Color Index*, Third Edition, 1971. Sources of these dyes are generally well known to those of ordinary skill in the relevant art.

The present ink set is required to comprise a cyan ink selected from the group consisting of Acid Blue 106, Acid Blue 175, Acid Blue 239, Acid Blue 258, Acid Blue 280, Acid Blue 290, Acid Blue 292, Acid Blue 294, Acid Blue 341 and Acid Blue 343, and mixtures thereof. The ink set further comprises at least one more additional ink, and optionally up to seven or more additional inks (up to eight or more total), wherein the colorant in each of the additional ink(s) is selected from the group consisting of Acid Yellow 79, Acid Blue 113, Acid Blue 260, Acid Green 28, Acid Black 194, Acid Red 361, Acid Red 131, Acid Orange 33, Reactive Red 245, Reactive Orange 95, Reactive Orange 13, and Acid Violet 48 with each ink in the each set being based on a different dye. In each case, the specified dye is the primary or sole colorant in the ink. An additional red ink which uses a combination of both Acid Orange 33 and Acid Red 249 in the same ink can be used in this ink set.

In a further preferred embodiment, the ink set with the aforementioned cyan dye further comprises one or more of inks (a) through (h) defined as follows:

(a) a yellow ink comprising Acid Yellow 79 dye (preferably from about 7 wt % to about 11 wt %) in an aqueous vehicle;

(b) a navy ink comprising Acid Blue 113 dye (preferably from about 4 wt % to about 8 wt %) in an aqueous vehicle;

(c) a blue ink comprising Acid Blue 260 (preferably from about 4 wt % to about 8 wt %) in an aqueous vehicle;

(d) a green ink comprising Acid Green 28 (preferably from about 2.5 wt % to about 7 wt %) in an aqueous vehicle;

(e) a black ink comprising Acid Black 194 (preferably from about 1 wt % to about 10 wt %) in an aqueous vehicle;

(f) a magenta ink comprising Acid Red 361 (preferably from about 4 wt % to about 8 wt %) or Reactive Red 245 (preferably from about 8 wt % to about 12 wt %) in an aqueous vehicle; and/or (g) an orange ink comprising Reactive Orange 95 or Reactive Orange 13 (preferably from about 8 wt % to about 12 wt %) in an aqueous vehicle and/or (h) a violet ink comprising Acid Violet 48 (preferably about 4 wt % to about 8 wt %) in and aqueous vehicle.

The preferred amounts of colorant listed above are expressed as weight percent of the total weight of ink.

Alternatively, for the ink set that used a magenta ink comprising Reactive Red 245 an additional red ink may be optionally used. The preferred red ink for this modification to the ink set is Acid Red 361.

The inventive cyan dye inks which have improved lightfastness provide a new option to combine inks to produce an ink set. Commonly used digital commercial textile printers can utilize up to eight inks. With this new cyan dye ink the printer has more flexibility in how the inks may be chosen to produce an ink set that provides the color breadth for digitally printed textiles.

The cyan inks of the present ink set provide excellent lightfastness. The cyan inks have a lightfastness at least that of the other inks in the ink set so that the lightfastness of a printed textile is substantially equal across the various colors printed. The cyan inks when used preferably in combination with the other lightfast inks can produce printed textiles with excellent lightfastness. The inventive cyan inks can also be used with less lightfast dyes to obtain an ink set for use with printed textiles where lightfastness is not a major performance requirement.

Vehicle

The vehicle is a carrier for the colorant. An "aqueous vehicle" refers to a vehicle comprised of water or a mixture of water and at least one water-soluble organic solvent (co-solvent). Selection of a suitable mixture depends on requirements of the specific application, such as desired surface tension and viscosity, the selected colorant, and compatibility with substrate onto which the ink will be printed.

Examples of water-soluble organic solvents include alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether An aqueous vehicle will typically contain about 30% to about 95% water with the balance (i.e., about 70% to about 5%) being the water-soluble solvent.

Additives

Other ingredients, additives, may be formulated into the inkjet ink, to the extent that such other ingredients do not interfere with the stability and jetability of the finished ink, which may be readily determined by routine experimentation. Such other ingredients are in a general sense well known in the art.

Although dyes, especially dyes like the acid and reactive dyes described herein, are generally considered soluble, sometimes dye solubilizing agents are needed. These materials promote dye solubility in the primary solvent. The material helps keep dyes in solution in the face of increasing concentration due to nozzle evaporation of the primary solvent. Typical loadings are 2-7 wt %. Examples of this type of component include n-methylpyrrolidone, 2-butyl-2-ethyl-1, 3-propanediol (BEPD); 2,4-diethyl-1,5-pentanediol (PD-9); 1, 8-octanediol; (cis)1,2-cyclohexanedimethanol; and 2-ethyl-1,3-hexanediol (EHD); 2-methyl-2-propyl-1,3-propanediol (MPPD); 1,4-cyclohexanedimethanol (CHDM) and the like.

Humectants may also be added. These low-volatile liquids are used to inhibit evaporation. The humectant should be miscible with the primary solvent. Typical humectants for aqueous inks are glycols. Humectant weight percentages can be a substantial fraction of the solvent, portion, typically 5 to 30 wt %.

Commonly, surfactants are added to the ink to adjust surface tension and wetting properties. Suitable surfactants include ethoxylated acetylene diols (e.g. Surfynols® series from Air Products), ethoxylated primary (e.g. Tomadol® series from Tomah Products) and secondary (e.g. Tergitol® series from Union Carbide) alcohols, sulfosuccinates (e.g.

Aerosol® series from Cytec), organosilicones (e.g. Silwet® series from GE Silicons) and fluoro surfactants (e.g. Zonyl® series from DuPont). Surfactants are typically used in the amount of about 0.01 to about 5% and preferably about 0.2 to about 2%, based on the total weight of the ink.

Polymers may be added to the ink to improve durability. The polymers can be soluble in the vehicle or dispersed (e.g. "emulsion polymer" or "latex"), and can be ionic or nonionic. Useful classes of polymers include acrylics, styrene-acrylics and polyurethanes.

Biocides may be used to inhibit growth of microorganisms. Buffers may be used to maintain pH. Buffers include, for example, tris(hydroxymethyl)-aminomethane ("Trizma" or "Tris").

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'', N'''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

The amount of vehicle in an ink is typically in the range of from about 70 wt % to about 99.8 wt %, and more typically from about 80 wt % to about 99 wt %. Colorant is generally present in amounts up to about 15 wt %. For flag and banner applications, the colorant is typically in the range of from about 3 wt % to about 12 wt %. Percentages are weight percent of the total weight of ink.

Other ingredients (additives), when present, generally comprise less than about 15 wt %, based on the total weight of the ink. Surfactants, when added, are generally in the range of from about 0.2 wt % to about 3 wt %, based on the total weight of the ink. Polymers can be added as needed, but will generally be less than about 15 wt %, based on the total weight of the ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 40 cP at 25° C., but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic.

Ink Set

The term "ink set" refers to all the individual inks or other fluids an inkjet printer is equipped to jet. The ink set of the present invention is required to contain an ink (first ink) based a cyan dye comprising a cyan dye in an aqueous vehicle, wherein said cyan dye is selected from the group consisting of Acid Blue 106, Acid Blue 158, Acid Blue 175, Acid Blue 239, Acid Blue 290, Acid Blue 292, Acid Blue 294, Acid Blue 341 and Acid Blue 343, and any mixtures thereof.

Additional inks in the ink set are preferably selected from inks (a) through (h) defined as previously defined. Thus, a second ink can be any one of inks (a) through (h). A third ink can also be any one of inks (a) through (h), provided that such third ink is not the same of inks (a) through (h) as selected for the second ink. A fourth ink can also be any one of inks (a) through (h), provided that such fourth ink is not the same of inks (a) through (h) as selected for the second and third inks. Likewise, five-, six-, seven- and eight-member ink sets can be constructed. The additional inks are all selected from inks (a) through (h) and each of these additional inks is different. The additional inks can be selected in any combination. The preferred amounts of colorant are expressed as weight percent of the total weight of ink.

When an ink set having the inventive cyan ink is chosen, color management can be used to characterize the ink set The color characterization can define a response for various printing ink mixtures in colorant space and with the textile to be printed. Using common ink jet techniques this color table/color profile can be used to print accurately colored images with the ink set.

Substrate

The instant ink set can be printed on many textile substrates, including, but not limited to synthetic polyamide fabric, silk, wool. It is especially advantageous for printing substrate that is synthetic polyamide fabric, and particularly flag and banner stock. Most commonly, the synthetic polyamide fabric fibers are nylon-6 and/or nylon-6,6 fibers. For flag and banner stock, the fabric is generally from about 70 to about 200 deniers. A commercial example of such stock is SolarMax® 185 bright Nylon 200 denier, SGS-667/50, prepared for print; and SolarMax® 185 bright HT Nylon 70 denier, SGS-773/76, prepared for print, both commercially available from Glen Raven Mills (Glen Raven, N.C.). SolarMax® is a trademark of Koch Industries.

The fabric is commonly pretreated prior to printing. Application of the pretreatment to the fabric can be any convenient method and such methods are generally well-known in the art. One example is an application method referred to as padding. In padding, a fabric is dipped in the pretreatment solution, then the saturated fabric is passed through nip rollers that squeeze out the excess solution. The amount of solution retained in the fabric can be regulated by the nip pressure applied by the rollers. Other pretreatment techniques include spray application wherein the solution is applied by spraying on the face or face and back of the fabric. The wet pick-up of pretreatment solution is preferably from about 20 and about 100 grams of solution, and more preferably from about 25 to about 75 grams of solution, per 100 grams of fabric.

After application of pretreatment the fabric is dried in any convenient manner. The final percent moisture is (approximately) equal to the equilibrium moisture of the pretreated fabric at ambient temperature, and can vary somewhat depending on the relative humidity of the surrounding air.

The resins remaining in the fabric after drying provide the absorbent layer for the inkjet inks during printing. It will be appreciated that sufficient resin must be present to absorb the ink load applied. On the other hand, the presence of too much resin may prevent proper penetration. Routine optimization will reveal appropriate coating levels for a given printer and ink set.

In addition to previously listed U.S. application Ser. No. 11/070,711 (filed Mar. 2, 2005), other suitable pretreatments include those disclosed in U.S. Pat. No. 6,656,228 and U.S. Patent Publication 2002/0081421.

Printing Method

Printing can be accomplished by any inkjet printer equipped for handling and printing fabric. Commercial printers include, for example, the DuPont™ Artistri™ 3320, 3210 and 2020 printers, and the Mimaki TX series of printers.

The amount of ink laid down on the fabric can vary by printer model, by print mode (resolution) within a given printer and by the percent coverage need to achieve a given color. The combined effect of all these considerations is grams of ink per unit area of fabric for each color. In one embodiment, ink coverage is preferably from about 5 to about 17 grams of ink per square meter of fabric. There is a balance between the ink density needed to achieve a desired color and the absorption capacity of the coating resins in the pretreatment.

Printed fabric will typically be post-treated according to procedures well-known in the textile art. A preferred post treatment is to heat the printed fabric with steam-treatment to set the printed inks, and washing the steam-treated fabric.

EXAMPLES

Preparation of Inks

Inks were prepared according to the formulations in the following tables wherein amounts are ink weight percent of the total weight of ink. Ingredients were mixed together and filtered. Water was deionized. Colorants were "inkjet grade" meaning that they were relatively pure and free of excessive amounts of salts. Surfynol® 440 is a surfactant from Air Products Corp (Allentown, Pa., USA). Proxel™ GXL is a Biocide from Avecia (Wilmington, Del., USA). Trizma is tris(hydroxymethyl)aminomethane. PEG 4600 is polyethylene glycol (4400 to 4800 average molecular weight). If necessary, the pH was adjusted to the desired range (about 6.5 to about 7.5 for reactive dyes; about 5.0 to about 9.5 for acid dyes) with nitric acid.

Table I lists the formulation for Inventive and Comparative Cyan Inks. Table II lists the other inks of the preferred ink set.

TABLE I

Cyan Inks; Inventive and Comparative

| | Inv Ex 1 Cyan AB-290 | Inv Ex 2 Cyan AB-290 | Inv Ex 3 Cyan AB-290 | Inv Ex 4 Cyan AB-239 | Comp Ex 1 Cyan AB-185 | Comp Ex 2 Cyan AB-279 |
|---|---|---|---|---|---|---|
| Ingredients | | | | | | |
| Dye | 5.5 | 4.2 | 4.1 | 6.34 | 4 | 3.70 |
| Ethylene glycol | 20 | 10 | 13.9 | 20.0 | 36.4 | |
| MPPD(2-methyl-2-propyl-1,3-propanediol) | — | 5.0 | 5.0 | | — | |
| Caprolactam | — | 5.0 | 5.0 | | — | |
| 2-Pyrrolidone | 20 | 19.0 | 19.0 | 20.0 | 10.0 | |
| Glycerol | 10 | 10.0 | 10. | 10.0 | 5.0 | 5.0 |
| PEG 4600 | 2.4 | 2.4 | — | 1.00 | 4.0 | |
| Surfynol ® 440 | 0.5 | 1.0 | 1.0 | 0.5 | 1.0 | 1.0 |
| Proxel ™ GXL | 0.2 | 0.2 | 0.2 | 0.2 | 0.2 | 0.2 |
| Trizma | 0.2 | 0.2 | 0.2 | 1.2 | 0.2 | |
| Butyl Carbitol | | | | | | 15.0 |
| Water (Balance to 100%) | Bal. | Bal. | Bal. | Bal. | Bal. | Bal. |
| Properties | | | | | | |
| pH | 8.5 | 8.5 | 8.5 | 8.5 | 9 | 7.55 |
| Viscosity (cps, 25° C.) | 9.1 | 8.7 | 7.0 | 8.5 | 9 | 2.59 |
| Surface Tension | 34.3 | 33.1 | 34.0 | 35.7 | 32 | 30.9 |

Comparative Ink with AB-279 was not tested for lightfastness; On nylon it had the following L*a*b*C*h*; 85.2, −16.6, −10.3, 19.6, 212. It was printed using an Epson 3000 printer.

TABLE II

Other inks of the preferred ink set

| | Yellow AY-79 | Navy AB-113 | Blue AB-260 | Violet AV-48 | Red AR-361 | Green AG-28 |
|---|---|---|---|---|---|---|
| Ingredients | | | | | | |
| Dye | 8.95 | 6 | 6 | 6 | 6.0 | 4.5 |
| Ethylene glycol | 23 | 22 | 20 | 23 | — | — |
| 1,5-Pentanediol | 20 | 20 | — | 20 | — | — |
| Caprolactam | — | — | 3 | — | 25.0 | — |
| 2-Pyrrolidone | — | — | 17 | — | 25.0 | 20.0 |
| Dipropylene glycol mono-n-propyl ether | — | — | — | — | — | 20.0 |
| Glycerol | 5 | 8 | 10 | 10 | — | 10.0 |
| PEG 4600 | — | 1.25 | 1.75 | 0.45 | 1.0 | 2.8 |

TABLE II-continued

Other inks of the preferred ink set

| | | | | | | |
|---|---|---|---|---|---|---|
| Surfynol ® 440 | 1 | 1 | 1 | 1 | 1.0 | 1.0 |
| Proxel ™ GXL | 0.2 | 0.2 | 0.2 | 0.2 | 0.2 | 0.2 |
| Trizma | 0.2 | 0.2 | 0.2 | 0.2 | 0.2 | 0.2 |
| Water (Balance to 100%) | Bal. | Bal. | Bal. | Bal. | Bal. to 100% | Bal. to 100% |
| Properties | | | | | | |
| pH | 8.5 | 8.5 | 8.5 | 8.5 | 8.5 | 8.5 |
| Viscosity (cps, 25° C.) | 8.85 | 9.2 | 8.9 | 9 | 8.5 | 9 |
| Surface Tension | 37.5 | 38.1 | 36 | 35.2 | 38 | 30 |

| | Ink Color and Dye CI Number | | |
|---|---|---|---|
| | Black AK-194 | Magenta RR-245 | Orange RO-13 |
| Ingredients | | | |
| Dye | 8 | 10 | 10 |
| Thiodiglycol | 40 | — | — |
| 2-Pyrrolidone | — | 5.25 | 5.26 |
| Glycerol | 10 | 10 | 10 |
| Propylene glycol | — | 20 | 20 |
| Polypropylene glycol | — | 3.8 | 4 |
| PEG 4600 | 0.75 | — | — |
| Surfynol ® 440 | 1 | 0.25 | 0.25 |
| Proxel ™ GXL | 0.2 | 0.2 | 0.2 |
| Trizma | — | 0.5 | 0.5 |
| Water (Balance to 100%) | Bal. | Bal. | Bal. |
| Properties | | | |
| pH | 5.5 | 7 | 7 |
| Viscosity (cps, 25° C.) | 9 | 7 | 7 |
| Surface Tension | 36 | 36 | 37 |

Print Tests

A DuPont™ Artistri™ 2020 printer was equipped with the yellow, navy, cyan, blue, violet, black, magenta, green and orange inks described above in any combination of eight inks or fewer including the inventive cyan ink. The printer was also equipped with SolarMax® (200 denier nylon) fabric, which was pretreated according to previously incorporated U.S. application Ser. No. 11/070,711 (filed Mar. 2, 2005). A variety of prints were made which were post treated by exposure to saturated steam (15 psig, 120° C.) followed by washing twice, first in cold water for 5 minutes, then warm water (60° C.) for 10 minutes.

After post treatment, the prints all showed good color and good penetration so that the prints were of substantially similar color density on both sides of the fabric with little or no bleed.

It should be noted that penetration and bleed are, in part, related to choice of dye, and not all dyes have similarly good bleed characteristics under the same conditions. The dyes specified herein are particularly advantageous as regards penetration and bleed.

The prints were evaluated for lightfastness (Xenon lamp for 40 hours) according to AATCC Method 16 (ISO 105-B02). Results are summarized in the following table. A higher number rating means better lightfastness (less color fade). For flags and banners, a rating of 3 is minimally acceptable, but a rating of 4 or 5 is preferred. Waterfastness was evaluated according to AATCC Method 107.

TABLE III

Lightfastness and Waterfastness of Cyan Dyes

| | Inv Ex 2 Cyan AB-290 | Inv Ex 4 Cyan AB-239 | Comp Ex 1 Cyan AB-185 | Comp Ex 2** Cyan AB-279 |
|---|---|---|---|---|
| Lightfastness | 4-5 | 4 | 2 | 2-2.5 |
| Waterfastness | 5 | 5 | | |

**Tested as a drawdown on nylon. Composition of drawdown ink in wt % AB-279, 7.25 dye, thiodiglycol, 10.; butyl carbitol, 5; hydroxyethylcellulose. 7; ammonium sulfate, 5; with the balance water.

TABLE IV

Inks for Ink Set, Lightfastness rating

| Ink (Dye) | Lightfastness rating |
|---|---|
| Red Ink (AR-361) | 4-5 |
| Yellow Ink (AY-79) | 3-4 |
| Green Ink (AG-28) | 4 |
| Navy Ink (AB-113) | 4-5 |
| Blue Ink (AB-260) | 4-5 |
| Violet Ink (AV-48) | 4 |
| Black Ink (AK-194) | 4 |
| Magenta Ink (RR-245) | 3-4 |
| Orange Ink (RO-13) | 4 |

As can be seen, seven of the eight inks had a lightfastness rating of at least three. The cyan inks in combination with the other inks listed above offer superior lightfastness and many other necessary properties including jetting performance, color, penetration, bleed and more. Preferably, for printing flags and banners, each ink in the ink set has a lightfastness rating of at least 3.

The color gamut was analyzed by the methodology described in U.S. Patent Publication 2004/0100643A1 in order to define which balance of inks would give the best gamut. A GRYKkNVB combination of inks was evaluated. This analysis requires the printing of 8 primaries along with all 2 component mixtures (28 in all). [In this case, the 8 inks included for gamut evaluation were CRYKGNVB; dilute black does little to extend the gamut. The single primaries were sampled at 15 levels of coverage and the two component mixtures were sampled at three levels of each component for a total of 9 patches per mixture. This target was printed three times, read on the Spectrolino (D50/2 deg), and averaged to generate a collection of points in L*a*b* space that represents an estimate of the gamut of the combined 8 full strength inks. This collection is subsequently sub-sampled to generate a collection of points in which all contributions of one ink at a time have been removed. The estimated gamut volumes of these collections are shown in the table below.

TABLE V

Gamut Volume Determinations

| Ink Set | Gamut Volume | Volume loss |
|---|---|---|
| All | 396,000 | |
| With Cyan contribution removed | 375,000 | −5% |
| With Blue contribution removed | 380,000 | −4% |
| With Green contribution removed | 387,000 | −2 |
| With Violet contribution removed | 371,000 | −6% |
| With Navy contribution removed | 395,000 | 0% |

The inventive cyan ink provide new options in combining the aforementioned inks to achieve an ink set that has good gamut and is lightfast.

The invention claimed is:

1. A dye-based inkjet ink set comprising at least two differently first and second colored inks, wherein at least the first ink is a cyan ink comprising a cyan dye in an aqueous vehicle, wherein the cyan dye is selected from the group consisting of Acid Blue 239 and Acid Blue 290 and mixtures thereof.

2. The dye-based ink set of claim 1, wherein the first ink comprises the cyan dye in an amount of from about 3 wt % to about 10 wt %, based on the total weight of ink.

3. The dye-based ink set of claim 1, wherein the first ink comprises the cyan dye in an amount of from about 4 wt % to about 7 wt %, based on the total weight of ink.

4. The dye-based ink set of claim 1, where the second colored ink is selected from the group consisting of inks (a) through (h) defined as follows:
   (a) a yellow ink comprising Acid Yellow 79 dye in an aqueous vehicle;
   (b) a navy ink comprising Acid Blue 113 dye in an aqueous vehicle;
   (c) a blue ink comprising Acid Blue 260 in an aqueous vehicle;
   (d) a green ink comprising Acid Green 28 in an aqueous vehicle;
   (e) a black ink comprising Acid Black 194 in an aqueous vehicle;
   (f) a magenta ink comprising Acid Red 361 or Reactive Red 245 in an aqueous vehicle;
   (g) an orange ink comprising Reactive Orange 13 or Reactive Orange 95 in an aqueous vehicle; and/or
   (h) a violet ink comprising Acid Violet 48 in an aqueous vehicle.

5. The dye-based ink set of claim 4, further comprising a third ink that is selected from the group consisting of inks (a) through (h), provided that such third ink is not the same of inks (a) through (h) as selected for the second ink.

6. The dye-based ink set of claim 5, further comprising a fourth ink that is selected from the group consisting of inks (a) through (h), provided that such fourth ink is not the same of inks (a) through (h) as selected for the second and third inks.

7. An ink set comprising the cyan ink of claim 1, further comprising:
   (a) a second ink that is a yellow ink comprising Acid Yellow 79 dye in an aqueous vehicle;
   (b) a third ink that is a navy ink comprising Acid Blue 113 dye in an aqueous vehicle;
   (c) a fourth ink that is a blue ink comprising Acid Blue 260 in an aqueous vehicle;
   (d) an fifth ink that is a green ink comprising Acid Green 28 in an aqueous vehicle, and
   (e) a sixth ink that is a black ink comprising Acid Black 194 in an aqueous vehicle;
   (f) a seventh ink that is a magenta ink comprising Acid Red 361 or Reactive Red 245 in an aqueous vehicle; and
   (g) an eighth ink that is a violet ink comprising Acid Violet 48 in an aqueous vehicle.

8. The dye-based ink set of claim 4, further comprising one or more of inks (a) through (h) defined as follows:
   (a) a yellow ink comprising from about 7 wt % Acid Yellow 79 dye in an aqueous vehicle;
   (b) a navy ink comprising from about 4 wt % to about 8 wt % Acid Blue 113 dye in an aqueous vehicle;
   (c) a blue ink comprising from about 4 wt % to about 8 wt % Acid Blue 260 in an aqueous vehicle;
   (d) a green ink comprising from about 2.5 wt % to about 7 wt % Acid Green 28 in an aqueous vehicle;
   (e) a black ink comprising from about 1 wt % to about 10 wt % Acid Black 194 in an aqueous vehicle;
   (f) a magenta ink comprising from about 1 wt % to about 8 wt % Acid Red 361 or from about 8 wt % to about 12 wt % Reactive Red 245 in an aqueous vehicle;
   (g) an orange ink comprising from about 8 wt % to about 12 wt % Reactive Orange 13 or Reactive Orange 95 in an aqueous vehicle; and/or
   (h) a violet ink comprising from about 4 wt % to about 8 wt % Acid Violet 48 in an aqueous vehicle.

9. The dye-based ink set of claim 8, further comprising at least server inks selected from of inks (a) through (h).

10. A method for ink let printing onto a fabric, comprising the steps of:
   (a) providing an ink jet printer that is responsive to digital data signals;
   (b) loading the printer with a fabric substrate to be printed;
   (c) loading the printer with a dye-based inkjet ink set comprising at least two differently colored inks, wherein at least one of the inks is a first ink which is an ink comprising a cyan dye in a aqueous vehicle, wherein said cyan dye is selected from the group consisting of Acid Blue 106, Acid Blue 158, Acid Blue 175, Acid Blue 239, Acid Blue 290, Acid Blue 292, Acid Blue 294, Acid Blue 341 and Acid Blue 343, and mixtures thereof; and
   (d) printing onto the fabric substrate using the dye-based inkjet ink set in response to the digital data signals;

the method futher comprising the steps of:
(e) heating the printed fabric with steam-treatment to set the colors, and
(f) washing the steam-treated fabric.

11. The method of claim 10, wherein the fabric is a polyamide fabric.

12. The method of claim 11, wherein the polyamide fabric is flag and banner stock.

13. The method of claim 11, wherein the polyamide fabric substrate is printed to an ink coverage of from about 5 to about 17 grams of ink per square meter of fabric.

14. A fabric article printed according the method of claim 10.

15. A polyamide fabric article printed according the method of claim 11.

16. The polyamide fabric article of claim 15, wherein the method further comprises the steps of:
(e) heating the printed fabric with steam-treatment to set the colors, and
(f) washing the steam-treated fabric.

17. The polyamide fabric article of claim 16, wherein the polyamide fabric is flag and banner stock.

* * * * *